United States Patent
Dominguez et al.

(10) Patent No.: US 6,947,260 B2
(45) Date of Patent: Sep. 20, 2005

(54) SYSTEM AND METHOD OF DAMPING VIBRATION ON COIL SUPPORTS IN HIGH PERFORMANCE DISK DRIVES WITH ROTARY ACTUATORS

(75) Inventors: Miguel Dominguez, San Jose, CA (US); Ambrish Misra, Milpitas, CA (US); Hatem Radwan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 269 days.

(21) Appl. No.: 10/298,442

(22) Filed: Nov. 18, 2002

(65) Prior Publication Data
US 2004/0095682 A1 May 20, 2004

(51) Int. Cl.$^7$ .............................. G11B 5/55; G11B 33/14
(52) U.S. Cl. .................. 360/265; 360/265.8; 360/97.02
(58) Field of Search ........................... 360/97.02, 97.03, 360/264.7, 265, 265.7, 265.8

(56) References Cited

U.S. PATENT DOCUMENTS

| | | | |
|---|---|---|---|
| 4,602,175 A | | 7/1986 | Castagna |
| 5,148,071 A | * | 9/1992 | Takahashi .................. 360/265 |
| 5,666,242 A | | 9/1997 | Edwards et al. |
| 5,764,441 A | | 6/1998 | Aruga et al. |
| 5,790,348 A | | 8/1998 | Alfred et al. |
| 5,825,585 A | | 10/1998 | Hatam-Tabrizi |
| 5,914,837 A | | 6/1999 | Edwards et al. |
| 5,930,071 A | | 7/1999 | Back |
| 5,936,808 A | | 8/1999 | Huang et al. |
| 6,225,771 B1 | | 5/2001 | Hammerle |
| 6,278,586 B1 | | 8/2001 | Shimazu et al. |
| 6,310,749 B1 | | 10/2001 | Beatty et al. |
| 6,512,658 B1 | * | 1/2003 | Jierapipatanakul et al. ...... 360/264.7 |

FOREIGN PATENT DOCUMENTS

| | | | | |
|---|---|---|---|---|
| JP | 59171077 A | * | 9/1984 | ........... G11B/21/02 |
| JP | 61271673 A | * | 12/1986 | ........... G11B/21/02 |
| JP | 62054878 A | * | 3/1987 | ........... G11B/21/02 |
| JP | 62102487 A | * | 5/1987 | ........... G11B/21/02 |
| JP | 63058678 A | * | 3/1988 | ........... G11B/21/02 |
| JP | 02179974 A | * | 7/1990 | ........... G11B/21/02 |
| JP | 03183348 A | * | 8/1991 | ........... G11B/21/02 |
| JP | 06251518 A | * | 9/1994 | ........... G11B/21/02 |

* cited by examiner

*Primary Examiner*—Craig A. Renner
(74) *Attorney, Agent, or Firm*—Bracewell & Giuliani LLP

(57) ABSTRACT

A damping assembly for the actuator of high performance disk drive assembly is formed from multiple materials. The damping assembly is added to the actuator to dampen vibration that occurs during operation of the drive. The damping assembly is connected to an exterior portion of a coil region of the actuator. The damping assembly helps dampen vibration modes for coil torsion and coil bending, thereby improving dynamics settling performance to improve overall file input/output throughput performance. This also allows for a higher voice coil motor torque constant by increasing the magnet radius, thereby also improving move time, which further improves file input/output throughput performance. The overall file performance is improved by reducing settling times associated with coil torsion and coil bending modes, and allowing a higher torque constant to also improve move time. Both of these effects contribute to improving file performance.

11 Claims, 2 Drawing Sheets

SYSTEM AND METHOD OF DAMPING VIBRATION ON COIL SUPPORTS IN HIGH PERFORMANCE DISK DRIVES WITH ROTARY ACTUATORS

BACKGROUND OF THE INVENTION

1. Technical Field

The present invention relates in general to an improved data access and storage system, and in particular to an improved system and method of damping vibration on a coil support in a high performance disk drive with a rotary actuator.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

Modern HDD throughput and storage capacity have been substantially increased by improvement in actuator design which has resulted in increased precision and speed in head placement. The more precisely the actuator can place the read/write head, the greater the drive track density. The term "servo bandwidth" denotes the cross-over frequency of an open loop transfer function applied to head positioning systems. As the track densities of HDDs increase, a high servo bandwidth is typically required to improve the Track Measurement Registration (TMR) performance. Mechanical resonance of the coil and carriage is one of the dominant factors that limit the servo bandwidth of a voice coil driven HDD. In addition, the demand for increased speed and storage capacity has resulted in ever faster and more compact hard disk drive (HDD) assemblies. Modern, high performance disk drives typically have several stacked disks that spin on a shaft at speeds exceeding 10,000 rpm. The track densities on these disks are often more than 12,000 tracks per inch (TPI). As the track density of HDDs increases, a high servo bandwidth becomes even more important to improve the efficiency of read/write operations as measured by TMR as well as other performance indicators.

In the prior art, a number of devices for and methods of improving dynamics settling performance have been proposed. For example, U.S. Pat. No. 5,930,071 to Back, U.S. Pat. No. 5,914,837 to Edwards, and U.S. Pat. No. 5,666,242 to Edwards, all address conventional methods of damping vibration at the pivot assembly. Other U.S. Patents, such as U.S. Pat. No. 6,310,749 to Beatty, and U.S. Pat. No. 5,936,808 to Huang, focus on vibration damping in the actuator arm. Still other U.S. Patents are directed to actuator damping. Examples of this latter type include U.S. Pat. No. 5,790,348 to Alfred, which utilizes plastic overmolding on the coil. This method is not appropriate for high performance disk drives since they require high stiffness in the coil supports to allow high TPI. U.S. Pat. No. 4,602,175 to Castagna, uses a damping layer in the coil bobbin, which also reduces the stiffness of the coil itself, thereby losing damping effectiveness due to the high temperature of the damping layer. Again, this solution will not work in high performance drives since they require high coil stiffness to allow high TPI. See also U.S. Pat. No. 5,764,441 to Aruga. Thus, it would be desirable to provide an improved method and system for minimizing the contribution of dynamic mechanical deformation of a HDD suspension and head apparatus to the off-track position error of read/write heads in a digital system. If implemented, such a system would serve to increase the access time, performance, and effective track density of a HDD assembly.

SUMMARY OF THE INVENTION

One embodiment of a damping assembly for the actuator of high performance disk drive assembly is formed from multiple materials. For example, the damping assembly may be a constrained layer damping apparatus. The damping assembly is added to the actuator to dampen vibration that occurs during operation of the drive. The damping assembly is connected to an exterior portion of a coil region of the actuator, which includes any portion of the voice coil, the coil support, and/or any combination of components of the coil region. In one version, the damping assembly is affixed to the coil region with an adhesive.

The damping assembly of the present invention provides several advantages for high performance disk drives. Adding a damping assembly such as constrained layer damping in the coil region of the rotary actuator helps dampen vibration modes for coil torsion and coil bending, thereby improving dynamics settling performance to improve overall file input/ output throughput performance. This also allows for a higher voice coil motor torque constant by increasing the magnet radius, thereby also improving move time, which further improves file input/output throughput performance. The overall file performance is improved by reducing settling times associated with coil torsion and coil bending modes, and allowing a higher torque constant to also improve move time.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PRESENT INVENTION

Figure 1:
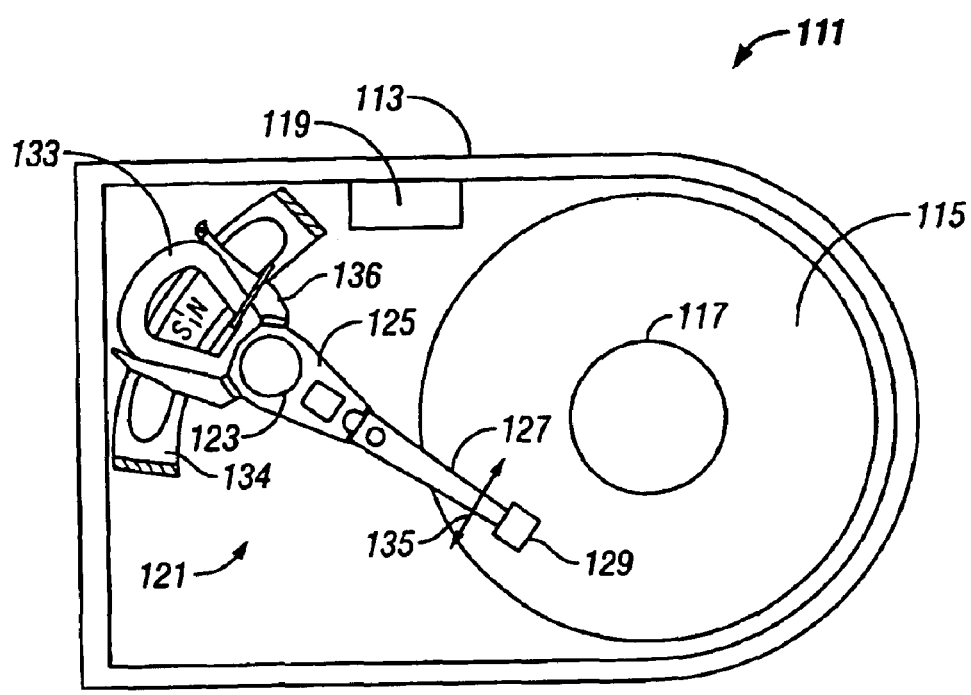
FIG. 1 is a schematic top view of one embodiment of a high performance disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub 117. An actuator 121 comprises a plurality of parallel actuator arms 125 (see, e.g., FIG. 2) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam or suspension 127. A magnetic read/write transducer or head 129 is mounted on a slider and secured to a flexure that is flexibly mounted to each suspension 127. The read/write heads 129 magnetically read data from and/or magnetically write data to disks 115. The level of integration called the head gimbal assembly is head 129 and the slider, which are mounted on suspension 127. The slider is usually bonded to the end of suspension 127. Head 129 is typically pico size (approximately 1250×1000×300 microns) and formed from ceramic or intermetallic materials. Head 129 also may be, for example, nano size (approximately 2050×1600×450 microns) and is pre-loaded against the surface of disk 115 (in the range two to ten grams) by suspension 127.

Suspensions 127 have a spring-like quality which biases or urges the slider air bearing surface against the disk to enable the creation of the air bearing film between the slider and disk surface. A voice coil 133 housed within a conventional voice coil motor magnet assembly 134 (top pole not shown) is also mounted to the main body of actuator 121 opposite the arms 125 and head gimbal assemblies. In the version shown, voice coil 133 is positioned between and connected to a coils support 136 which comprises, for example, a pair of finger-like projections that extend integrally from the main body of actuator 121. Movement of the actuator 121 (indicated by arrow 135) by controller 119 moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Figure 2:
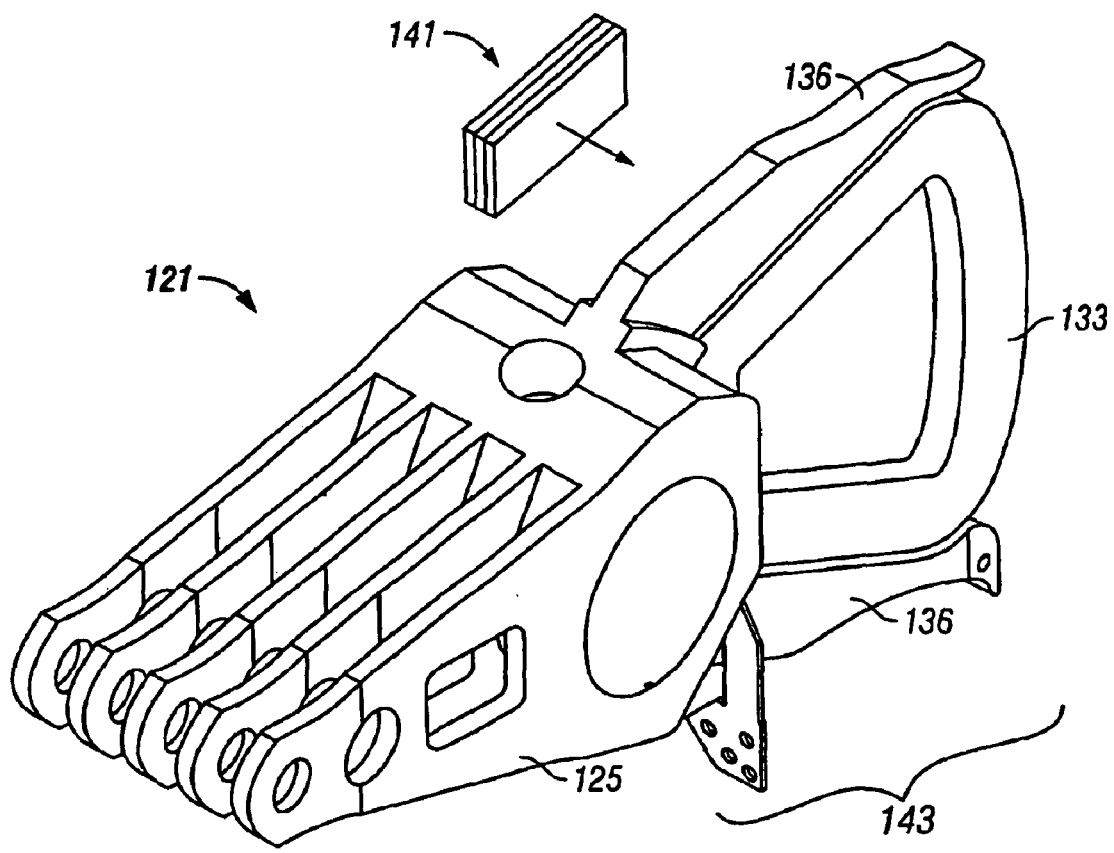
FIG. 2 is an isometric view of one embodiment of an actuator of the high performance disk drive of FIG. 1, shown with a damping assembly exploded therefrom.
Figure 3:
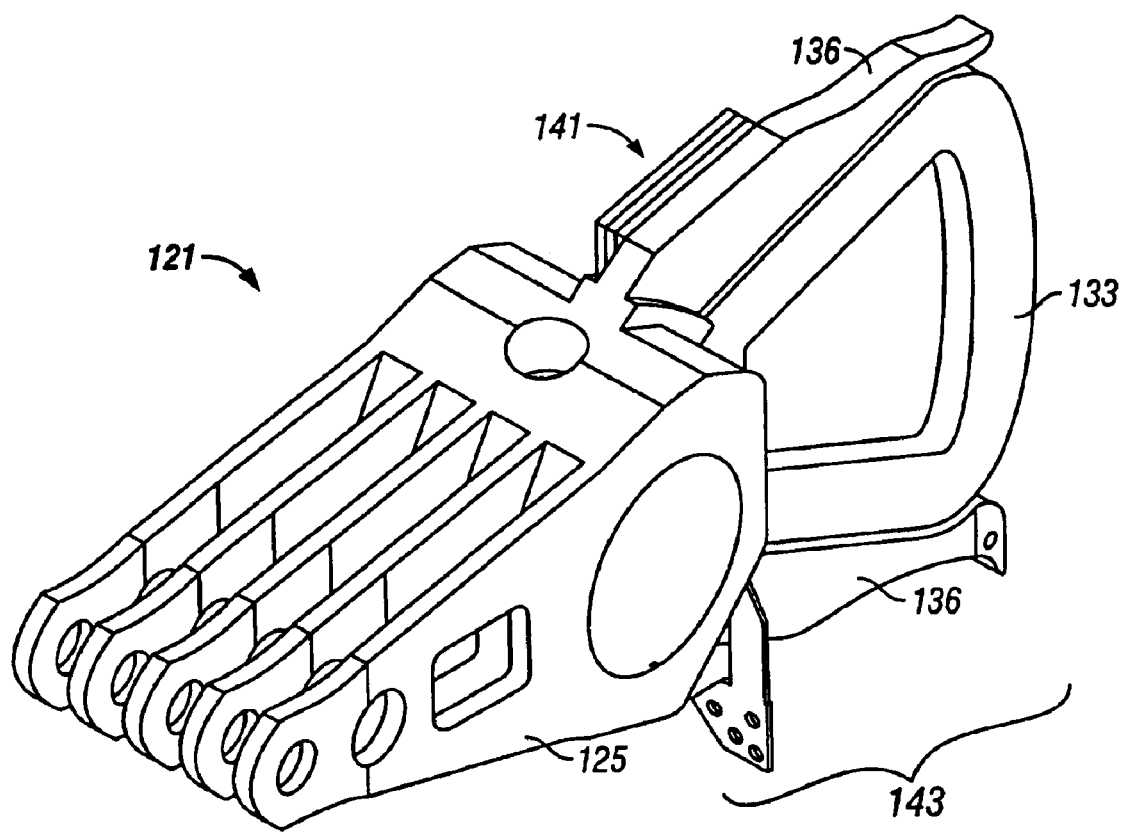
FIG. 3 is an isometric view of the actuator of FIG. 2, shown with the damping assembly affixed thereto.

Referring now to FIGS. 2 and 3, a more detailed view of the actuator 121 of drive 111 is shown. In this embodiment, actuator 121 includes a damper or damping assembly 141. Damping assembly 141 may comprise one or materials that are added to actuator 121 to dampen vibration that occurs during operation of the drive 111. In the version shown, damping assembly 141 is formed from one or more layers of material that are connected to only to a portion of an exterior portion of the coil region 143 of actuator 121. The "coil region" 143 is defined herein as any portion of voice coil 133, coil support 136, and/or any combination thereof, such that damping assembly 141 may straddle multiple components of coil region 143 without departing from the scope of the invention.

Damping assembly 141 may be affixed to coil region 143 by a number of different attachment systems or methods, but is preferably joined thereto with an adhesive. As stated above, damping assembly 141 may comprise multiple materials, and may be formed as a constrained layer damping apparatus, as shown in FIG. 2. In this version, damping assembly 141 includes a thin layer or foil of a metallic material, such as aluminum or stainless steel, to which is attached a layer of elastic, viscoelastic, or still other material. Again, layers of adhesive maybe used to join the various components of damping assembly 141 together, and to actuator 121. In addition, the size and shape of damping assembly 141 is not limited to the embodiment shown. Rather, the size, shape, thickness, etc., of damping assembly 141 may be varied to meet any desired performance requirements. Moreover, a plurality of damping assemblies 141, each of which may have different shapes and dimensions, may be used at multiple application points on actuator 121.

The present invention provides several advantages for high performance disk drives. Adding a damping assembly such as constrained layer damping in the coil region of the rotary actuator helps dampen vibration modes for coil torsion and coil bending, thereby improving dynamics settling performance to improve overall file input/output throughput performance. This also allows for a higher voice coil motor torque constant (Kt). The Kt can be increased by increasing the magnet radius, which also can increase coil torsion and coil bending excitation. However, the damping system of the present invention dampens coil torsion and coil bending vibrations, and therefore allows increased magnet radius and increased Kt. These parameters also improve move time, which further improves file input/output throughput performance. The overall file performance is improved by reducing settling times associated with coil torsion and coil bending modes, and allowing a higher torque constant to also improve move time. Both of these effects contribute to improving file performance.

It is particularly advantageous to use the present invention to attenuate coil torsion and coil bending since these two modes normally have low frequencies, thereby decreasing the rate of their vibration attenuation. These modes are usually two of the most problematic modes for high performance disk drives, causing long settle times and degraded performance, as they are excited during seek operations and often amplified by the servo system during settling in high performance rotary actuator hard disk drives. Damping these two modes with the present invention makes the vibrations attenuate quickly, which allows higher TPI and faster access time and performance, although it does not help increase the servo bandwidth.

While the invention has been shown or described in only some of its forms, it should be apparent to those skilled in the art that it is not so limited, but is susceptible to various changes without departing from the scope of the invention.

What is claimed is:

1. A high performance disk drive, comprising:
    a base;
    at least one disk rotatably connected to the base;
    an actuator pivotably connected to the base, the actuator having a coil region comprising a voice coil and a coil support having a pair of arms that extend from the actuator and surround at least a portion of the voice coil, and a transducer for reading data from and writing data to the disk; and
    a damper connected to the voice coil and only one of the arms of the coil support for damping vibration of the high performance disk drive during operation of the high performance disk drive.

2. The high performance disk drive of claim 1, wherein the damper comprises a constrained layer damping assembly having a rectangular shape and being smaller in size than one of the arms of the coil support.

3. The high performance disk drive of claim 1, wherein the damper comprises a constrained layer damping assembly having at least one metallic layer secured, via an adhesive bond, to at least one elastic layer, and wherein the constrained layer damping assembly is adhesively bonded to the coil region.

4. The high performance disk drive of claim 1, wherein the damper straddles both the voice coil and the coil support.

5. The high performance disk drive of claim 1, wherein the coil region has an exterior surface only a portion of which the damper is connected to such that the damper is asymmetric with respect the coil region.

6. A high performance disk drive, comprising:
    a base;
    at least one disk rotatably connected to the base;
    an actuator pivotably connected to the base, the actuator having a coil region and a transducer located opposite the coil region for reading data from and writing data to the disk, wherein the coil region includes a voice coil and a coil support having a pair of arms that extend from the actuator and surround at least a portion of the voice coil; and
    a constrained layer damping assembly connected to only one of the arms of the coil support in an asymmetric configuration for damping vibration of the high performance disk drive during operation of the high performance disk drive, the constrained layer damping assembly comprising at least one metallic layer secured to at least one elastic layer, via a adhesive bond, and wherein the constrained layer damping assembly is adhesively bonded to the coil support.

7. The high performance disk drive of claim 6, wherein the constrained layer damping assembly is connected to and straddles both the voice coil and the coil support.

8. The high performance disk drive of claim 6, wherein the coil region has an exterior surface only a portion of which the constrained layer damping assembly is connected to, and the constrained layer damping assembly has a rectangular shape and is smaller in size than one of the arms of the coil support.

9. A method of damping vibration in a high performance disk drive, comprising:
    providing a base having at least one rotatable disk and a pivot actuator including a coil region with a voice coil and a coil support having a pair of arms that extend from the pivot actuator and surround at least a portion of the voice coil;
    attaching a constrained layer damping assembly to only one of the arms of the coil support in an asymmetric configuration; and
    operating the high performance disk drive with the constrained layer damping assembly affixed to the coil region, such that the constrained layer damping assembly dampens vibration of the high performance disk drive.

10. The method of claim 9, further comprising providing the constrained layer damping assembly with a rectangular shape and a smaller size than one of the arms of the coil support.

11. The method of claim 9, further comprising providing the constrained layer damping assembly with at least one metallic layer secured, via an adhesive bond, to at least one elastic layer, and wherein said constrained layer damping assembly is adhesively bonded to the coil support.

* * * * *